United States Patent Office 3,458,095
Patented July 29, 1969

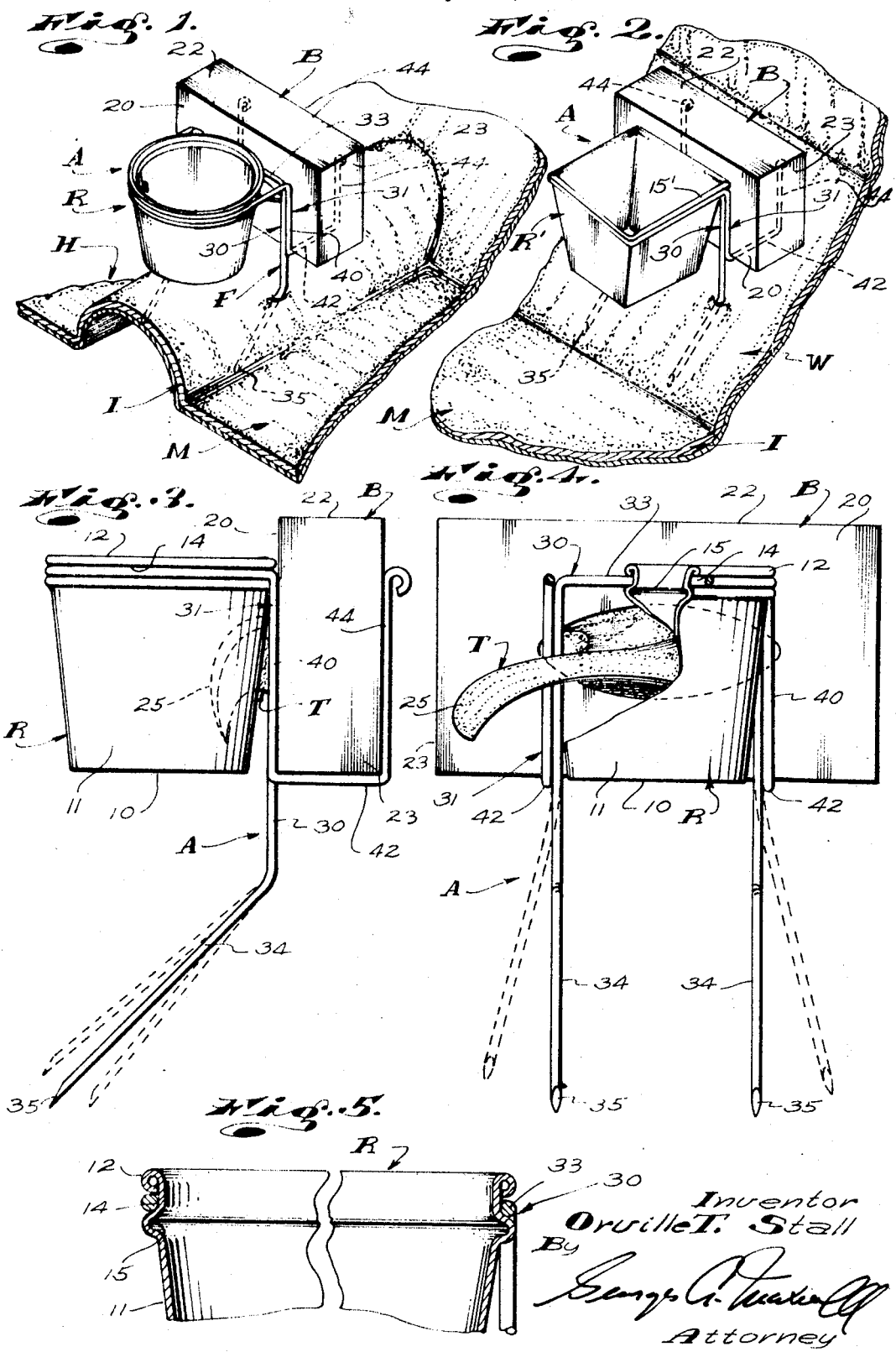

3,458,095
COMBINATION TISSUE DISPENSER AND WASTE RECEPTACLE
Orville T. Stall, Whittier, Calif. (% American Beauti Pleat Co., 13545 Excelsior Drive, Norwalk, Calif. 90650)
Filed Sept. 21, 1967, Ser. No. 669,464
Int. Cl. B60r 7/00
U.S. Cl. 224—42.42                                      10 Claims

ABSTRACT OF THE DISCLOSURE

The combination of a tissue dispensing box, a waste tissue receptacle and a unitary frame engaging and supporting the box and receptacle and having a pair of laterally spaced, substantially parallel, downwardly projecting, readily formable and bendable, sharply pointed auto floor mat piercing support legs.

---

An object of my invention is to provide a frame with means to facilitate mounting the frame in the driver's compartment of a passenger car and adapted to support and carry a standard paper container or waste receptacle and a standard facial tissue dispensing box in a neat, attractive and convenient relationship with each other and within the driver's compartment of the automobile.

As a result of anti-litter laws and the desire of persons using automobiles to have a ready available supply of cleansing tissue and a convenient means of disposing of such tissues and other waste, there has, in recent years been many attempts to satisfy these wants and needs.

The means provided by the prior art to satisfy the above-noted wants and needs have involved separate means for carrying and supporting tissue dispensing boxes and for carrying or establishing waste receptacles.

Those means provided for mounting and supporting tissue dispensing boxes in automobiles have involved various forms of clips and fasteners for securing the dispensing boxes to the sun visors; the dashboards and the door hardware of automobiles.

Those means provided to establish waste receptacles or to mount and secure waste receptacles in automobiles have involved the provision of paper sacks with suitable mounting means thereon, to secure the sacks to the dashboards or door hardware of automobiles, or have involved the provision of buckets or can-like receptacles with supporting hooks, loops, and clips, etc., for supporting the receptacles to the dashboards or door hardware of automobiles.

One known exception to the above is the provision of a bucket-like receptacle having an elongate, flexible bean bag type base secured thereto, which base is adapted to be engaged over the central longitudinally extending hump established by the propeller shaft tunnel in the floor of an automobile, forward of the front seat and rearward of the fire wall. This form of receptacle mounting means positions the receptacle in the most convenient and advantageous position in an automobile, but is unsatisfactory in that it is readily displaced and upset as by inadvertent bumping of the container with one's foot and when driving the automobile over rough roads and the like.

In each of the foregoing general examples, the receptacles and dispensers are separate from each other and are such that they cannot be positioned in close and convenient proximity with each other. An automobile provided with both a waste receptacle and a tissue dispensing means, as provided by the prior art, appears cluttered and is rendered unattractive by such means.

An object of the present invention is to provide a novel combination wire supporting frame, tissue dispenser box and waste receptacle, which frame arranges the box and receptacle in close, neat, compact and convenient to use relationship.

Another object of the invention is to provide a combination of the character referred to wherein the support frame is provided with novel means for securely mounting the related dispenser box and receptacle above the propeller shaft humps in the floors of automobiles, forward of the driver's seat, or on the forwardly and upwardly inclined foot rest portion normally provided in the floors of automobiles.

It is an object of this invention to provide a structure of the charcter referred to wherein the receptacle is a conventional, standard, bucket-like paper receptacle releasably engaged in and supported by the frame and a structure wherein the tissue dispenser is a conventional, standard, tissue dispenser box releasably engaged in and supported by the frame and a structure wherein the receptacle and dispenser box can be individually or independently removed from and replaced in the frame, without upsetting or otherwise working on or manipulating the remainder of the structure.

Yet another object of the present invention is to provide a structure of the character referred to wherein the receptacle normally cooperates with the dispenser to releasably hold the lead end of the next tissue to be dispensed, which end projects out from the dispenser box and is subject to being caught by wind and drawn from the dispenser box and which is also subject to being shifted back into the dispenser box with the result that it must be fished out from the box before it can be used.

The foregoing and other objects and features of my invention will be fully understood from the following detailed description of a typical preferred form and application of my invention, throughout which description reference is made to the accompanying drawings, in which:

FIG. 1 is an isometric view of the structure related to the hump provided in the floor of an automobile;

FIG. 2 is an isometric view showing a slightly different form of my invention related to the inclined foot rest portion of the floor in an automobile;

FIG. 3 is a side view of my new construction;

FIG. 4 is a front view of my new construction;

FIG. 5 is a rear view of my new construction.

The structure A that I provide includes generally a carrier and support frame F, trash receptacle R and a tissue dispenser B.

The receptacle R and dispenser B are standard conventional items readily available on the open market.

The receptacle R is a paper bucket or tub-like unit having a flat, disc-shaped bottom wall 10, a cylindrical, slightly tapered or upwardly divergent side wall 11, and a radially outwardly and downwardly rolled rim 12 about the upper edge of the side wall.

The receptacle R is that type of paper receptacle manufactured by Lilly Cup Company and others for use by delicatessens and food processors to pack food and is such that a plurality of such receptacles can be advantageously stacked, one within the other, as indicated in dotted lines in FIG. 3 of the drawings.

In practice, and as illustrated, the upper edge portion of the side wall of the receptacle is formed with an outwardly projecting bead 13, below the rolled rim 12 and cooperates with the rim to define a radially outwardly opening channel groove 14.

In point of fact, the manufacturers of such containers or receptacles establish the bead 13 to provide a radially inwardly opening groove 15 to cooperatively receive the peripheral edge of a disc-shaped closure for such receptacles.

Receptacles R, such as set forth above, are available in many different sizes. In carrying out this invention I prefer to use a receptacle having a volume of one quart.

While I prefer to employ a round tab-like receptacle, as illustrated in FIGS. 1 and 3 through 5 of the drawings, square paper tubs R', such as illustrated in FIG. 2 of the drawings, are readily available and can, if desired, be employed without departing from the spirt of this invention.

The tissue dispenser employed is a simple, rectangular box having a front wall 20, a rear wall 21, and four right angularly related side and end walls 22 and 23. The front wall 20 is provided with a central, longitudinally extending opening or slot 24 through which tissues T, within the box, are drawn. The tissues within the box are folded and stacked so that each time one tissue is withdrawn, it draws a lead edge or end portion 25 of the next tissue out through the slot for subsequent engagement and withdrawal.

The above-noted dispenser B is a standard or conventional dispenser such as is manufactured and sold by Kleenex Corporation and others.

The frame F that I provide is a unitary structure formed of wire stock and is completely free of moving parts.

The frame F is established by two substantially U-shaped wire parts, there being a mounting part 30 and a carrier 31.

The mounting part 30 has a pair of elongate, parallel, laterally spaced, vertical leg portions 32, a horizontal cross portion 33 joined integrally with and extending between the upper ends of the leg portions 32 and elongate, downwardly extending pin portions or pins 34, the lower ends of which are sharpened or pointed as at 35.

The wire stock from which the frame is established is sufficiently reliable so that the pins can, as illustrated in FIGS. 1, 3 and 5 of the drawings, be bent to extend horizintally or at 90 degrees from vertical, or can be inclined forwardly at an angle of about 45 degrees, which is the approximate angle of the inclined footrest portions of the floors in ordinary or conventional automobiles.

The lateral spacing of the leg portions and pins is such that the pins can be advantageously arranged at the opposite sides of the hump H established by the propeller shaft wells or tunnels in the floors of conventional automobiles.

In practice, the wire from which the frame is established is sufficiently soft so that the pins can be bent laterally outwardly slightly to compensate for slight variations in the lateral spacing of the sides of the humps H in the floors of automobiles produced by different manufacturers. The vertical extent of the leg portions is substantially equal to vertical extent of the receptacle.

The cross portion 33 of the mounting part 30 of the frame F is adapted to extend tangentially of the rear side of the receptacle R and to engage in the groove 14 at the upper portion thereof to support the adjacent portion of the receptacle, as will be apparent from the drawings and as will hereinafter be described.

The carrier part 31 of the frame F is characterized by a pair of laterally spaced, vertical, central, leg portions 40 arranged adjacent and fixed to the leg portions 32 of the mounting part 30.

The part 31 has a forwardly projecting head portion 41 formed integrally with and extending between the upper ends of the leg portions 40 and corresponding in longitudinal and lateral extent with the diametric or longitudinal and lateral extent of the upper rim portion of the receptacle. The head potrion 41 occurs in a common plane with the cross portion 33 of the part 30 and in the preferred form or carrying out of the invention has a radiused or rounded front end portion, which portion seats in and extends about the forward 180 degrees of the groove 14 in the receptacle.

In the modified form of the invention shown in FIG. 2 of the drawings, the front end portion of the head portion is square and serves to engage and seat about the side and front rim portions of the square receptacle.

The part 31 further includes rearwardly projecting foot portions 42 projecting rearwardly from the lower ends of the leg portions 40 and upwardly projecting arm portions 44 on the rear ends of said foot portions. The foot portions of the part 31 correspond in longitudinal extent with the depth or thickness of the box, between the front and rear walls thereof. The arm portions are substantially equal in vertical extent with the leg portions 40. The related leg portions 32-40 of the parts 30 and 31 of the frame are spaced apart a distance equal to or slightly greater than the longitudinal extent of the dispensing slot 24 in the front wall 20 of the box B.

The vertical extent of the legs 40 and arms 44 of the frame is slightly less than the vertical extent of the box.

In practice, the foot portions of the frame occur in the same horizontal plane as the bottom of the receptacle.

With the above relationship of parts, it will be apparent that the frame F is adapted to cooperatively receive and hold the box with the bottom side of the box stopped and supported on the foot portions 42 and with the leg and arm portions of said part 31 establishing snug frictional engagement on the front and rear walls of the box and with the slot opening 24 in the box between the leg portions, below the cross portion 33 and rearward of the receptacle R.

In practice, and as illustrated, the upper ends of the arms can be suitably bent over, rearwardly and downwardly, to render the ends of the arms safe, for obvious reasons.

In essence, the frame F that I provide is a unitary wire structure defining a pair of laterally spaced, central, elongate, forwardly or forwardly and downwardly projecting pins with pointed terminal ends, a pair of laterally spaced, upwardly opening, U-shaped, box-engaging clips joined integrally with each other and the upper ends of the pins and projecting rearwardly therefrom, and an upwardly opening, receptacle supporting head or loop joined integrally with, extending between and projecting forwardly from the upward forward portions of the clips.

In use, the receptacle R is urged downwardly into and through the loop or head portion of the frame and until the loop stops against the receptacle rim or snaps into engagement in the groove 14 in the upper rim portion of the receptacle. The tissue box B is slid downwardly into engagement in the clips to seat on the bottom or foot portions of the clips and where it is held snugly between the leg and arm portions of said clips.

The above assembly is then mounted in the automobile with which it is to be related in one of two locations and/or manners.

In substantially all standard or conventional automobiles, the floors thereof are provided with central, longitudinally extending, upwardly projecting humps H to accommodate the propeller shaft for the automobile which extends below said floor. Such automobile floors are further provided with forwardly and upwardly inclined footrest portions.

The floor of a conventional automobile is covered with a suitable mat, established of a sheet of rubber or carpeting. A pad of insulating material is ordinarily provided between the mat and the adjacent floor.

In the preferred carrying out of the invention, the structure that I provide is arranged above the hump H in the floor of the automobile with the pins thereof piercing the mat M at each side of said hump and extending forwardly through the insulating pad I (adjacent the side walls of the hump). The structure is preferably initially urged downwardly until the bottom of the receptacle R and the lower side of the dispenser box B engage and rest upon the top of the hump. The sharp ends of the pins are then urged through the seat, into the pad, and the entire structure is urged and moved forwardly.

With the elongate horizontally extending pins that I provide, it will be apparent that a far superior and more stable mounting for the remainder of the construction is provided than would be provided with vertical pins, and that the lateral spacing of said pins embracing the hump affords the structure with considerable lateral stability.

In an alternate installation, shown in FIG. 2 of the drawings, the structure is mounted on the footrest portion of the floor of the vehicle. In this installation, the pins are bent to be inclined forwardly and downwardly at the same angle as the foot rest potrion of the floor and are entered through the mat M' and into the insulating pad I' to extend downwardly and forwardly therebetween, in lateral spaced relationship and until the lower rear corners of the clips and the lower rear portion of the box B' stop against and are supported by the mat and the floor.

It will be apparent that in the last described installation of my new structure, the structure is firmly and securely mounted so that it cannot be readily inadvertently displaced and so that the receptacle is in an upright position.

When my structure is thus mounted, a tissue T can be withdrawn from the box B, through the opening 24 therein from either side of and behind the receptacle R. When a tissue is thus withdrawn from the box, the lead end 25 of the next tissue is drawn from the box and is drawn laterally from behind the receptacle in the same direction from which the preceding tissue was withdrawn. The receptacle, occurring in front of said opening 24 in the box, holds the forwardly and laterally projecting end portion 25 of the tissue sufficiently so that said end portion of the tissue cannot be caught by the end or the like and inadvertently displaced from the box B, and so that the end portion of the tissue cannot shift back and drop into the box, as might be the case and happen when the supply of tissue in the box is partially depleted and the contents are shaken and vibrated (as by operation of the automobile) in such a manner as to cause the tissues to settle in the lower portion of the box.

In practice, the tubs can be provided with a single, simple, outwardly projecting rim flange 12' as illustrated in FIG. 2 of the drawings, which flange simply engages, stops and rests upon the horizontal tub supporting portion of the frame.

Having described my invention, I claim:

1. A combination waste receptacle and tissue dispenser for engagement with an automobile floor structure with a covering mat including, a tub-like receptacle with a flat, horizontal bottom, substantially vertical side walls and an outwardly projecting rim, a rectangular tissue dispenser box with front and rear walls, right, angularly related side and end walls and a dispensing slot in one wall, and a unitary wire carrier and support frame including a pair of upwardly opening, laterally spaced, U-shaped clips with lower horizontal foot portions and vertical front and rear leg and arm portions, a loop-like receptacle engaging head portion extending between and projecting forwardly from the uper ends of the leg portions and an elongate pin continuing from the lower end of each leg portion, said receptacle engaged through said head portion with said rim stopped against said head portion, said box engaged in and extending between said clip portions with its bottom side stopped on said foot portions and yieldingly held between said leg and arm portions, said pins engaged through said mat to extend between and held by said mat and floor structure.

2. A structure as set forth in claim 1 wherein the box engages and stops against the mat when the pins are fully engaged through the mat and between the mat and floor structure.

3. A structure as set forth in claim 1 wherein the bottom of the receptacle and the bottom side of the box occur in a common plane and engage and are supported by the mat.

4. A structure as set forth in claim 1 wherein the said floor structure includes an upwardly projecting, longitudinally extending hump over which said mat extends, said pins being bent horizontally to project forwardly and being engaged through the mat at opposite sides of the hump and projecting forwardly between the mat and the adjacent sides of the hump.

5. A structure as set forth in claim 1 wherein the said floor structure includes an upwardly projecting, longitudinally extending hump over which said mat extends, said pins bent horizontally to project forwardly and being engaged through the mat at opposite sides of the hump and projecting forwardly between the mat and the adjacent sides of the hump, the bottom of the receptacle and the bottom side of the box occurring in a common horizontal plane and engaged and supported on the mat at the top of the hump.

6. A structure as set forth in claim 1 wherein said dispensing slot in the box occurs in the front wall of the box between said leg portions and rearward of the receptacle, whereby the receptacle yieldingly engages and holds a lead end of a tissue projecting outwardly through said opening between said receptacle and front wall and against displacement.

7. A structure as set forth in claim 1 wherein the box engages and stops against the mat when the pins are fully engaged through the mat and between the mat and floor structure, said dispensing slot in the box occurring in the front wall of the box between said leg portions and rearward of the receptacle, whereby the receptacle yieldingly holds a lead end of a tissue projecting outwardly through said opening between said receptacle and front wall and against displacement.

8. A structure as set forth in claim 1 wherein the bottom of the receptacle and the bottom side of the box occur in a common plane and engage and are supported on the mat, said dispensing slot in the box occurring in the front wall of the box between said leg portions and rearward of the receptacle, whereby the receptacle yieldingly holds a lead end of a tissue projecting outwardly through said opening between said receptacle and front wall and against displacement.

9. A structure as set forth in claim 1 wherein the said floor structure includes an upwardly projecting, longitudinally extending hump over which said mat extends, said pins being bent horizontally to project forwardly and being engaged through the mat at opposite sides of the hump and projecting forwardly between the mat and the adjacent sides of the hump, said dispensing slot in the box occurring in the front wall of the box between said leg portions and rearward of the recptacle, whereby the receptacle yieldingly holds a lead end of a tissue projecting outwardly through said opening between said receptacle and front wall and against displacement.

10. A structure as set forth in claim 1 wherein the said floor structure includes an upwardly projecting, longitudinally extending hump over which said mat extends, said pins being bent horizontal to project forwardly and being engaged through the mat at opposite sides of the hump and projecting forwardly between the mat and the adjacent sides of the hump, the bottom of the receptacle and the bottom side of the box occurring in a common horizontal plane and engaged and supported by the mat and the top of the hump when the pins are fully engaged through the mat and between the mat and floor structure, said dispensing slot in the box occurring in the front wall of the box between said leg portions and rearward of the receptacle, whereby the receptable yieldingly holds a lead end of a tissue projecting outwardly through said opening between said receptacle and front wall and against displacement.

References Cited

UNITED STATES PATENTS

| | | |
|---|---|---|
| 2,294,151 | 8/1942 | Wooten et al. |
| 3,072,245 | 1/1963 | Faltin _____ 206—19.5 |
| 3,089,597 | 5/1963 | Kaplan _____ 224—42.45 X |
| 3,285,398 | 11/1966 | Larkin _____ 206—19.5 |
| 3,357,614 | 12/1967 | Berg. |

GERALD M. FORLENZA, Primary Examiner

U.S. Cl. X.R.

206—19.5; 224—42.45